US005636597A

United States Patent [19]
Van Curen et al.

[11] Patent Number: 5,636,597
[45] Date of Patent: Jun. 10, 1997

[54] ANIMAL SEPARATOR SYSTEM

[75] Inventors: Greg Van Curen; Michael D. Westrick, both of Fort Wayne, Ind.

[73] Assignee: Innotek Pet Products, Inc., Garrett, Ind.

[21] Appl. No.: 395,319

[22] Filed: Feb. 28, 1995

[51] Int. Cl.$^6$ .................................................. A01K 29/00
[52] U.S. Cl. ......................................................... 119/720
[58] Field of Search ................................. 119/718, 719, 119/720, 721; 340/573, 565, 562

[56] References Cited

U.S. PATENT DOCUMENTS

| | | |
|---|---|---|
| 3,167,753 | 1/1965 | Fairburn . |
| 3,582,933 | 6/1971 | Place . |
| 4,627,385 | 12/1986 | Vinci . |
| 4,802,482 | 2/1989 | Gonda et al. . |
| 4,876,674 | 10/1989 | Parmely et al. . |
| 4,887,549 | 12/1989 | Powell . |
| 4,947,795 | 8/1990 | Farkas . |
| 5,046,453 | 9/1991 | Vinci . |
| 5,241,923 | 9/1993 | Janning ................................. 119/721 |
| 5,424,330 | 6/1995 | Touchton et al. ..................... 119/721 |
| 5,435,271 | 7/1995 | Touchton et al. ..................... 119/721 |

Primary Examiner—Thomas Price
Attorney, Agent, or Firm—Barnes & Thornburg

[57] ABSTRACT

An animal separator system designed to encourage two or more animals to keep away from one another by an adjustable or a predetermined fixed distance and to encourage one or more animals to keep away from a person or object by an adjustable or a predetermined fixed distance. The system includes separator units which establish individual boundaries. The separator units can be worn by a subject or located at a fixed location. When the boundaries of two or more separator units overlap, a first one of the separator units transmits an interrogate signal. The interrogate signal is received by a second one of the boundary overlapping separator units which responds to the interrogate signal by transmitting a reply signal. The reply signal is received by the first separator unit, which responds by transmitting an acknowledge signal. At least one of the separator units includes a stimulator which will apply a corrective stimulus to an animal in response to either the reply signal or the acknowledge signal.

32 Claims, 5 Drawing Sheets

ANIMAL SEPARATOR SYSTEM

BACKGROUND AND SUMMARY OF THE INVENTION

The present invention relates to an animal separator system. More particularly, the present invention relates to an animal separator system designed to encourage two or more animals to keep away from one another by an adjustable or a predetermined fixed distance and to encourage one or more animals to keep away from a person or object by an adjustable or a predetermined fixed distance.

An owner of two or more animals may desire to keep them away from one another. Such separation may be necessary for a variety of reasons, such as one animal being more aggressive than the other or both animals being aggressive towards one another. Oftentimes, an animal owner may also desire to keep one or more animals away from a variety of people or objects, such as small children which may be injured by an animal, a pool in which the animal may enter and be unable to exit, or a garden which may be damaged or destroyed by the animal.

Owners do not want to have to constantly monitor their animals in order to keep them separated from one another or prevent their contact with children and certain objects, such as those described above. In addition, even if an owner constantly monitors his or her animal, voice command may be insufficient to stop or deter the animal. Furthermore, confining the animal through such means as a leash may be impractical or inadequate depending upon the strength of the leash and animal.

The present invention addresses these problems. An embodiment of the invention includes a separator system having a first transmitter capable of transmitting a first interrogation signal at a first time during an interrogation interval, a first reply signal, and a first acknowledge signal. The system also includes a second transmitter capable of transmitting a second interrogation signal at a second time during the interrogation interval that is different than the first time, a second reply signal, and a second acknowledge signal. The system additionally includes a first receiver that receives each of the second interrogation, the second reply, and second acknowledge signals when they are transmitted within a first predetermined distance from the first receiver and a second receiver that receives each of the first interrogation, first reply and first acknowledge signals when they are transmitted within a second predetermined distance from the second receiver. The system additionally includes first and second stimulators and a first controller associated with the first transmitter and the first receiver that actuates the first transmitter to transmit the first interrogation signal, the first reply signal in response to the second interrogation signal, and the first acknowledge signal in response to the second reply signal. The first controller also actuates the first stimulator to administer a first correction stimulus to a first animal in response to either the second reply signal or the second acknowledge signal. The system still further includes a second controller associated with the second transmitter and second receiver that actuates the second transmitter to transmit the second interrogation signal, the second reply signal in response to the first interrogation signal, and the second acknowledge signal in response to the first reply signal. The second controller also actuates the second stimulator to administer a second correction stimulus to a second animal in response to either the first reply signal or the first acknowledge signal.

In one or more embodiments, both the first transmitter and first receiver as well as the second transmitter and second receiver may be transceivers. Additionally, both the first and second interrogation signals may include pulses. The duration of these pulses may be approximately 0.5 msec. Furthermore, the first and second reply signals may include a plurality of pulses and, in one or more embodiments, this number may be eight pulses. Furthermore, the first and second acknowledge signals may also include a plurality of pulses, and, in one or more embodiments, this number may be eight pulses.

The above-described system may include a third transmitter capable of transmitting a third interrogation signal at a third time during the interrogation interval that is different from the first and second times, a third reply signal and a third acknowledge signal. This embodiment of the system also includes a third receiver that receives the first and second interrogation signals, the first and second reply signals, and the first and second acknowledge signals, when they are transmitted within a third predetermined distance. This embodiment of the system additionally includes a third stimulator and a third controller associated with the third transmitter and the third receiver that actuates the third transmitter to transmit the third interrogation signal, the third reply signal in response to either the first or second interrogation signals, and the third acknowledge signal in response to either the first or second reply signals. Additionally, the controller actuates the third stimulator to administer a third correction stimulus to a third animal in response to either the first reply signal, the first acknowledge signal, the second reply signal, or the second acknowledge signal.

The first controller may be configured to actuate the first transmitter to transmit the first reply signal after expiration of a first time delay and the second controller may be configured to actuate the second transmitter to transmit the second reply signal after expiration of a second time delay. These first and second time delays may have different values to prevent overlap of the first and second reply signals.

The first transmitter, first receiver, first stimulator, and first controller may be attached to a collar fitted to the first animal and the second transmitter, second receiver, second stimulator, and second controller may also be attached to a collar fitted to the second animal.

The first controller may be selectable between an enabled mode in which the first controller actuates the first stimulator to administer the first correction stimulus to the first animal in response to either the second reply signal or the second acknowledge signal, and a disable mode in which the first controller is unresponsive to the second reply signal and the second acknowledge signal. Additionally, the second controller may be selectable between an enabled mode in which the second controller actuates the second stimulator to administer the second correction stimulus to the second animal in response to either the first reply signal or the first acknowledge signal, and a disable mode in which the second controller is unresponsive to the first reply signal and the first acknowledge signal.

Both the first, second, and third stimulators may each be separately configurable to administer a plurality of corrective stimuli to the respective first, second, and third animals. This corrective stimuli may include a plurality of different levels of electrical energy, a plurality of different levels of tones, or a combination of both.

The above-described first, second, and third distances may be adjustable. Alternatively, they may be fixed at the same or different values.

Another embodiment of the present invention includes a separator system having a first transmitter for transmitting an interrogation signal during a first time interval an acknowledge signal in response to a reply signal during a third time interval. This separator system also includes a first receiver for receiving the reply signal during a second time interval. Additionally, this system includes a second transmitter for transmitting the reply signal during the second time interval in response to the interrogation signal and a second receiver for receiving the interrogation signal, when it is transmitted within a predetermined distance from the first transmitter, and for also transmitting the acknowledge signal. Finally, this embodiment of the system includes a stimulator that applies a corrective stimulus to an animal in response to either the reply signal or the acknowledge signal.

The above-described distance may be adjustable or, alternatively, fixed at a predetermined distance. Additionally, the first transmitter and first receiver, as well as the second transmitter and second receiver, may be separate respective first and second transceivers.

Other objects, advantages and novel features of the present invention will become apparent from the following detailed description of the invention when considered in conjunction with the accompanying drawings.

DETAILED DESCRIPTION OF THE DRAWINGS

Figure 1:
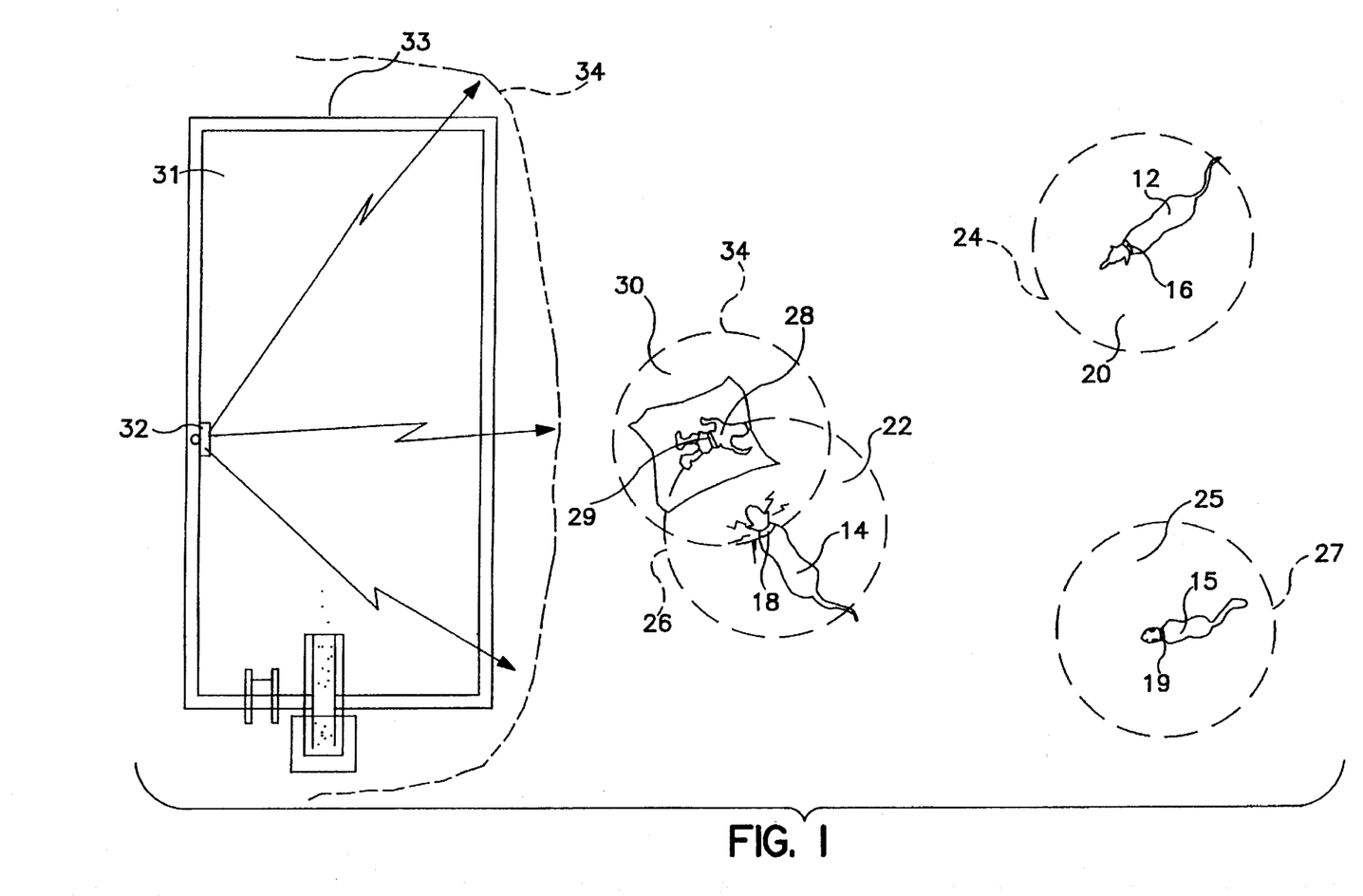
FIG. 1 is a plan view of an embodiment of the present invention in use in an area in which three animals are to be kept separated from one another by an adjustable or a predetermined fixed distance, are to be kept away from a baby or child by an adjustable or a predetermined fixed distance, and are to be kept away from a pool by an adjustable or a predetermined fixed distance.

FIG. 1 is a plan view of an animal or pet separator system 10 constructed in accordance with the present invention in use with a pair of dogs 12 and 14 and a cat 15. As can be seen in FIG. 1, collars 16 and 18 are attached to respective dogs 12 and 14 and collar 19 is attached to cat 15. Collars 16, 18, and 19 are used to fit separator units (not shown in FIG. 1) to these animals.

Boundaries 20 and 22 are defined around respective dogs 12 and 14 by these separator units and are generally indicated by dashed boundary lines 24 and 26. A boundary 25 is also defined around cat 15 and generally indicated by dashed boundary line 27. As can be seen, boundaries 20, 22, and 25 extend a predetermined, generally uniform, fixed distance around respective animals 12, 14, and 15. In one or more other embodiments of the present invention, these boundaries may be adjustable. In accordance with the present invention, if any two of boundaries 20, 22, and 25 overlap, either or both of the animals receive a stimulus intended to encourage the animals to stay apart at least the predetermined distance. This stimulus may be audio, electrical, or a combination of both and is designed to be administered at safe levels that will not cause injury to the animals.

A third separator unit (not shown) is attached to a baby or small child 28 by a belt 29 and defines a boundary 30 around child 28, that extends a predetermined, generally uniform, distance, as generally indicated by dashed boundary line 34. The third separator unit is placed on child 28 to define boundary 30 so that animals 12, 14, and 15 remain a predetermined distance away. System 10 of the present invention can be configured so that if any of the boundaries 20, 22, or 25 overlap with boundary 30, respective animals 12, 14, or 15 will receive a stimulus, as described above, that will encourage the animal to keep a predetermined distance away from child 28. The third unit is configured so that no stimulus is delivered to child 28 if any of boundaries 20, 22, or 25 overlap with boundary 30.

A fourth separator unit 32 is shown placed adjacent pool 31 to define a boundary 33 generally indicated by dashed boundary line 34. System 10 is configured so that if any of boundaries 20, 22, or 25 overlap with boundary 33, respective animals 12, 14, or 15 will receive a stimulus, as described above, that will encourage the animal to keep a predetermined fixed distance away from pool 31. This helps prevent animals 12, 14, or 15 from entering pool 31 where they may be unable to exit. As with boundaries 20, 22, and 25, in one or more other embodiments of the present invention, boundary 33 may be adjustable. In addition, although boundaries 20, 22, 25, 30, and 33 are shown as being generally circular, it is to be understood that other boundary patterns, such as a generally oval pattern, are within the scope of the present invention. Although not shown, it is to be understood that separator units of the present invention may be used with other types of animals, as well as other objects, such as gardens.

Figure 2:
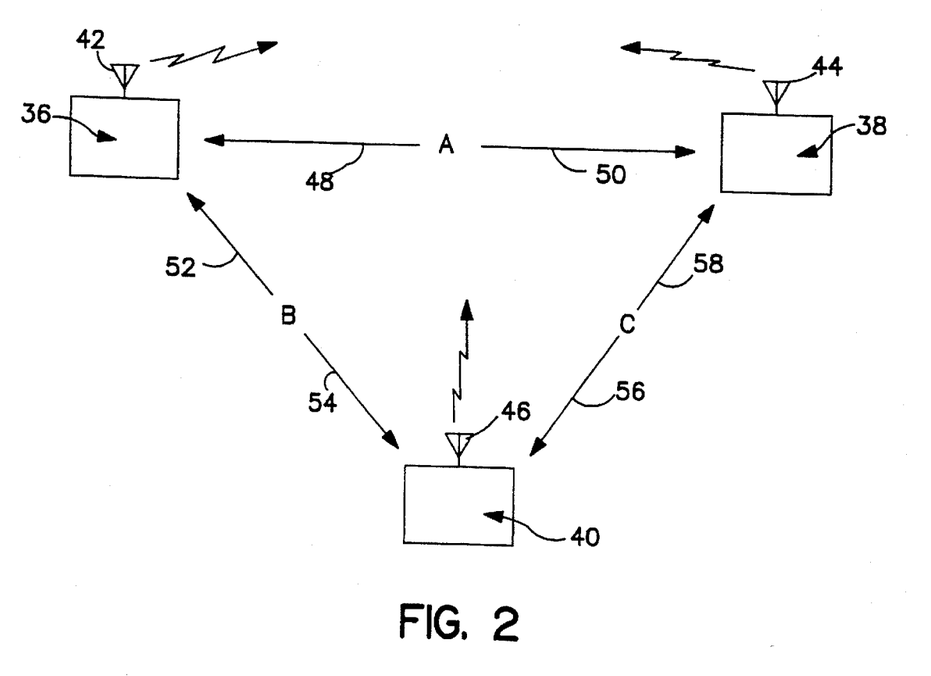
FIG. 2 is a block diagram illustrating an embodiment of the present invention that utilizes three separator units, at least one of which is fitted to an animal, that are designed to keep that animal, as well as any other animals to which units are fitted, an adjustable or predetermined fixed distance from the other separator units.

A block diagram illustrating the use of three separator units 36, 38, and 40 constructed in accordance with the present invention is shown in FIG. 2. At least one of these separator units is fitted to an animal so that the animal is kept a predetermined distance away from the other separator units which may be fitted to other animals or located adjacent inanimate objects, such as those described above in connection with FIG. 1. As can be seen in FIG. 2, each unit includes an antenna 42, 44 and 46 that transmits signals to and receives signals from other units, as discussed more fully below.

As discussed above, each separator unit 36, 38, and 40 is configured to keep the object to which it is attached, if animate, a predetermined distance away from the other separator units. This is accomplished by administering a corrective stimulus. For example, units 36 and 38 are configured to remain a predetermined distance "A" away from one another as generally indicated by arrows 48 and 50. Units 36 and 40 are configured to remain a predetermined distance "B" away from one another as generally indicated by arrows 52 and 54. Finally, units 38 and 40 are configured to remain a predetermined distance "C" away from one another as generally indicated by arrows 56 and 58. In one embodiment of the present invention, distances "A", "B", and "C" are approximately five feet. However, it is to be understood, that other ranges are possible and that the values for distances "A", "B", and "C" do not have to be the same. For example, distance "A" could be five feet, distance "B" ten feet, and distance "C" fifteen feet. In addition, as discussed above, distances "A", "B", and "C" may be adjustable. Furthermore, although only three separator units are shown in FIG. 2, it is to be understood that system 10 may include as few as two separator units and more than the three shown.

Figure 3:
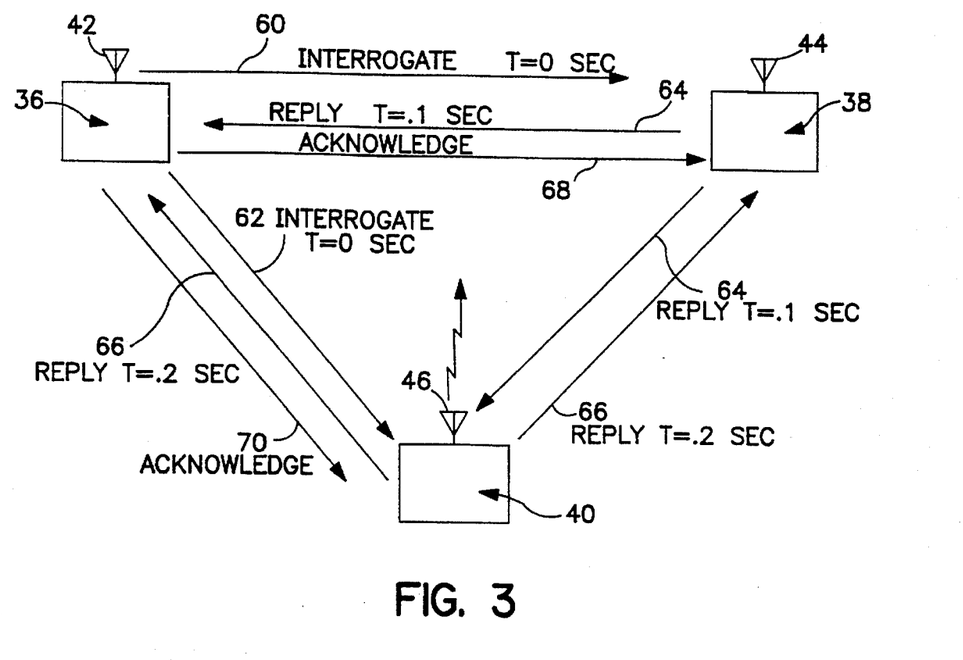
FIG. 3 is a diagram illustrating handshaking signals used by the separator units illustrated in FIG. 2 in accordance with the present invention.

Handshaking signals used by separator units 36, 38, and 40 of the present invention are shown in FIG. 3. These handshaking signals include an interrogate signal, a reply signal, and an acknowledge signal. As shown, separator unit 36 has sent out an interrogate signal generally indicated by arrows 60 and 62 in FIG. 3. For purposes of explanation, the time at which the interrogate signal of unit 36 is sent out is chosen to be at T=0 seconds. Separator units 38 and 40 receive respective interrogate signals 60 and 62 when and if they are within the respective, above-described, distances A and B from unit 36. In this case, units 38 and 40 are within respective distances A and B and receive the interrogate signal from unit 36. This causes unit 36 to become the master and units 38 and 40 the slaves. In response to these interrogate signals, both separator units 38 and 40 send reply signals, during a reply time interval or, alternatively, first and second reply time delays, as generally indicated by arrows 64 and 66 in FIG. 3. Unit 38 sends a reply at time, T=0.1 seconds, and unit 40 sends a reply signal at time, T=0.2 seconds. Reply signals 64 and 66 are coded to assure interrogating unit 36 that the replies from units 38 and 40 are not random noise or false signals at the same frequency. These reply signals are staggered (i.e. delayed from one another so as to be transmitted at different times during the reply time interval) to prevent both units from replying at the same moment during the reply time interval, which would cause overlap of reply signals 64 and 66 at separator unit 36 and require retransmission of these reply signals. Although the values of T=0.1 seconds and T=0.2 seconds are shown, it is to be understood that other staggered values for transmission times are within the scope of the present invention. Upon receipt of the reply signals from units 38 and 40, unit 36 transmits an acknowledge signal to each of separator units 38 and 40 indicating that it has received the replies from these units. This acknowledge signal is generally indicated by arrows 68 and 70 in FIG. 3. Acknowledge signals 68 and 70 are coded to assure units 38 and 40 that they have replied to a valid interrogator unit.

In one digital embodiment of the present invention, the interrogate signals transmitted by units 36, 38, and 40 are single pulses. These pulses may have a duration of approximately 0.5 milliseconds. Use of a single pulse of short duration helps conserve power. In the same or a different embodiment of the present invention, the reply and acknowledge signals are each eight pulses. Although a specific number of pulses and a duration for each of these pulses has been given for the interrogate, reply, and acknowledge signals, it is to be understood that other values are within the scope of the present invention. In addition, analog embodiments of the present invention are also possible.

Separator units 36, 38 and 40 each contain a stimulator that may be selectably configured between an enabled mode to apply a corrective stimulus to the animal to which it is attached and a disabled mode in which no stimulus is applied. This stimulus may be in the form of an audio stimulus, an electrical stimulus, or a combination of both. The audio stimulus may include a plurality of different levels of audio stimuli and the electrical stimulus may include a plurality of levels of electrical stimuli. The stimulators may be selectably enabled so that they can be used on animate objects to which a stimulus is to be applied as well as animate objects to which a stimulus is not to be applied. For example, unit 36 could be fitted to a small, passive dog, and unit 38 could be fitted to a large, aggressive dog, the owner of which wants to train to stay away from the smaller dog. The owner might decide that only the large dog should receive a stimulus if the two animals come within a predetermined distance of one another. Another example would be the attachment of unit 36 to a baby or small child and unit 38 to an animal, such as a dog, intended to be kept away from the child. In this case, unit 36 would be disabled and unit 38 would be enabled. In yet another possible application, units 36 and 38 could be attached to animals that are, for example, aggressive towards one another, the owner or owners of which desire to both be trained to stay away from the other animal. In this case, units 36 and 38 could both be enabled to administer corrective stimuli. Allowing the separator units of the present invention to be selectably enabled provides for use of the present invention in a variety of circumstances, such as those described above.

In the encounter scenario illustrated in FIG. 3, unit 36 would administer a corrective stimulus to the animal to which it is attached, if enabled, at the end of the reply time interval or, alternatively, the first reply time delay, and units 38 and 40 would administer corrective signal stimuli to the animals to which they are fitted, also at the end of the reply time interval or second or third reply time delays, if enabled, and if they had received acknowledge signals from unit 36, as generally indicated by respective arrows 68 and 70. The length of the reply time interval or the reply time delays is chosen so that master unit 36 can receive replies from multiple slave units, thereby allowing units 36, 38, and 40 to administer corrective stimuli at approximately the same time. Although a particular encounter scenario is illustrated in FIG. 3, it is to be understood that other scenarios are possible. For example, only two separator units may interact or, alternatively, more than three separator units may interact. Additionally, the master-slave relationship between the separator units may change. For example, separator unit 36 may approach separator unit 38 during its sending of an interrogation signal, in which case unit 38 would become the master unit and unit 36 the slave unit.

Figure 4:
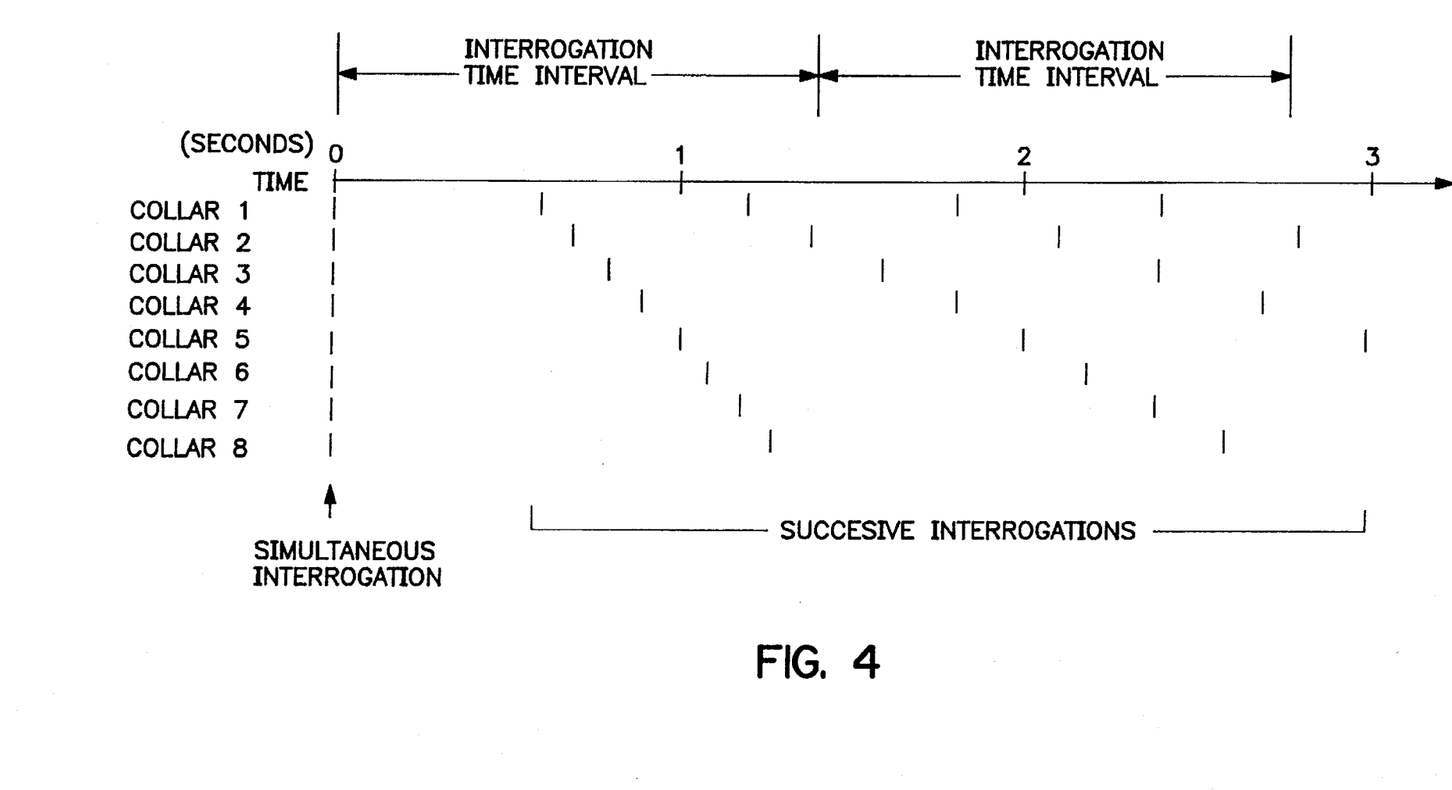
FIG. 4 is a diagram illustrating different interrogation signal rates transmitted by eight different separator units that are staggered to facilitate reduction of simultaneous overlap of interrogation signals from two or more separator units.

FIG. 4 illustrates transmission of staggered interrogation signals in accordance with the present invention for a system 10 utilizing 8 different units fitted to eight different animals via collars 1 through 8. As can be seen in FIG. 4, each interrogation signal is transmitted at different times during an interrogation time interval to facilitate reduction of simultaneous overlap of interrogation signals from two or more separator units. Such overlap causes errors in system 10 that requires error correcting and retransmission of interrogate signals. As described above, the reply signals sent by separator units 36, 38, and 40 of system 10 are also staggered to prevent overlap of replies and error correcting and retransmission.

Figure 5:
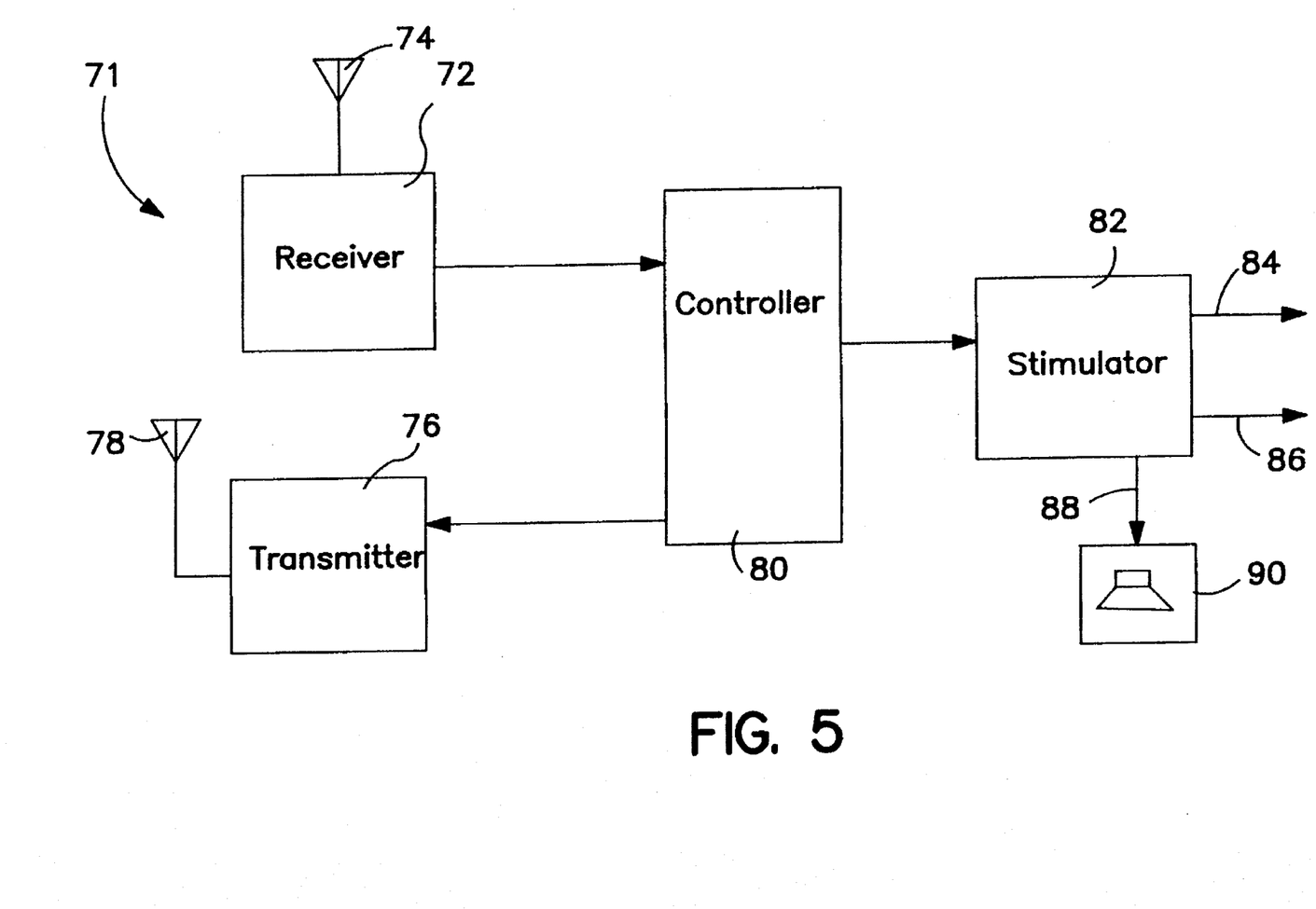
FIG. 5 is a circuit block diagram of a digital embodiment of a separator unit constructed in accordance with the present invention.

A circuit block diagram of a separator unit 71 constructed in accordance with the present invention is shown in FIG. 5. This embodiment includes a receiver 72 that receives signals through an antenna 74, a transmitter 76 that transmits signals through an antenna 78, a controller 80, and a stimulator 82. Controller 80 receives signals from receiver 72 and actuates transmitter 76 in response to signals received from receiver 72. In addition, controller 80 actuates stimulator 82 to administer a corrective stimulus to an animal. Stimulator 82 includes a pair of probe lines 84 and 86 that are associated with a pair of probes (not shown) that administer at least one level of corrective electrical signal stimulus to an animal, as described above. Stimulator 82 also includes an audio line 88 associated with and driving an audio module 90 to administer a corrective audio stimulus to an animal in the form of a tone. Audio module 90 may be configured and driven by stimulator 82, as shown, or, alternatively, by controller 80. Audio module 90 may also be configured and driven by either stimulator 82 or controller 80 to administer a plurality of different levels of audio tones. In addition, stimulator 82 may be configured and driven by controller 80 to administer a plurality of different levels of electrical stimulus, as well as a combined electrical stimulus and audio stimulus to the animal. Use of controller 80 allows such things as signal timing (i.e., the timing of the interrogate, reply, and acknowledge signals) of separator unit 71 to be reconfigured by revising software code, rather than rewiring hardware components. This helps save time, expense, and, oftentimes, weight and size.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. An animal separator system, comprising:
  a first transmitter which transmits a first interrogation signal at a first time during an interrogation interval, a first reply signal, and a first acknowledge signal;
  a second transmitter which transmits a second interrogation signal at a second time during the interrogation interval that is different than the first time, a second reply signal, and a second acknowledge signal;
  a first receiver receiving the second interrogation signal, the second reply signal, and the second acknowledge signal that is transmitted within a first predetermined distance;
  a second receiver receiving the first interrogation signal, the first reply signal and the first acknowledge signal that is transmitted within a second predetermined distance;
  a first stimulator;
  a second stimulator;
  a first controller connected to the first transmitter and first receiver and actuates the first transmitter to transmit the first interrogation signal, the first reply signal in response to the second interrogation signal, and the first acknowledge signal in response to the second reply signal, and actuates the first stimulator to administer a first correction stimulus to a first animal in response to one of the second reply signal and the second acknowledge signal; and
  a second controller connected to the second transmitter and second receiver and actuates the second transmitter to transmit the second interrogation signal, the second reply signal in response to the first interrogation signal, and the second acknowledge signal in response to the first reply signal, and actuating the second stimulator to administer a second correction stimulus to a second animal in response to one of the first reply signal and the first acknowledge signal.

2. The system of claim 1, wherein the first transmitter and the first receiver connected to a first transceiver, and further wherein the second transmitter and the second receiver having a second transceiver.

3. The system of claim 1, wherein the first and second interrogation signals include at least one pulse.

4. The system of claim 3, wherein the duration of the first and second interrogation pulses is approximately 0.5 milliseconds.

5. The system of claim 1, wherein the first and second reply signals include a plurality of pulses.

6. The system of claim 5, wherein the first and second reply signals each include 8 pulses.

7. The system of claim 1, wherein the first acknowledge signal includes a plurality of pulses and the second acknowledge signal includes a plurality of pulses.

8. The system of claim 7, wherein the first and second acknowledge signals each include 8 pulses.

9. The system of claim 1, further comprising:
  a third transmitter which transmits a third interrogation signal at a third time during the interrogation interval that is different from the first and second times, a third reply signal, and a third acknowledge signal;
  a third receiver receiving the first and second interrogation signals, the first and second reply signals, and the first and second acknowledge signals transmitted within a third predetermined distance;
  a third stimulator;
  a third controller connected to the third transmitter and the third receiver and actuates the third transmitter to transmit the third interrogation signal, the third reply signal in response to receiving one of the first and second interrogation signals, and the third acknowledge signal in response to receiving one of the first and second reply signals, and actuating the third stimulator to administer a third correction stimulus to a third animal in response to one of the first reply signal, the first acknowledge signal, the second reply signal, and the second acknowledge signal.

10. The system of claim 1, wherein the first controller actuates the first transmitter to transmit the first reply signal after expiration of a first time delay and the second controller actuates the second transmitter to transmit the second reply signal after expiration of a second time delay, the first and second time delays having different values to prevent overlap of the first and second reply signals.

11. The system of claim 1, wherein the first transmitter, the first receiver, the first stimulator, and the first controller are attached to a collar fitted to the first animal, and further wherein the second transmitter, the second receiver, the second stimulator, and the second controller are attached to a collar fitted to the second animal.

12. The system of claim 1, wherein the first controller is selectable between an enabled mode in which the first controller actuates the first stimulator to administer the first correction stimulus to the first animal in response to one of the second reply signal and the second acknowledge signal, and a disabled mode in which the first controller is unresponsive to the second reply signal and the second acknowledge signal, and further wherein the second controller is selectable between an enabled mode in which the second controller actuates the second stimulator to administer the second correction stimulus to the second animal in response to one of the first reply signal and the first acknowledge signal, and a disabled mode in which in the second controller is unresponsive to the first reply signal and the first acknowledge signal.

13. The system of claim 1, wherein the first stimulator administers one of a plurality of corrective stimuli to the first animal and the second stimulator administers one of a plurality of corrective stimuli to the second animal.

14. The system of claim 13, wherein the corrective stimuli administered by both the first and second stimulators include one of a plurality of different levels of electrical energy and a plurality of different levels of tones.

15. The system of claim 1, wherein the first and second distances are adjustable.

16. An animal separator system, comprising:
  a first transceiver which transmits a first interrogation signal at a first time, a first reply signal in response to a second interrogation signal, and a first acknowledge signal in response to a second reply signal, and receives the second interrogation signal, the second reply signal, and the second acknowledge signal within a first distance;

a second transceiver transmits the second interrogation signal at a second time different than the first time, the second reply signal in response to the first interrogation signal, and the second acknowledge signal in response to the first reply signal, and receives the first interrogation signal, the first reply signal, and the first acknowledge signal when within a second distance;

a first stimulator connected to the first transceiver means administers a first corrective stimulus to a first animal in response to one of the second reply signal and the second acknowledge signal; and a second stimulator connected to the second transceiver means administers a second corrective stimulus to a second animal in response to one of the first reply signal and the first acknowledge signal.

17. The system of claim 16, wherein the first transceiver includes a first transmitter and a first receiver, and the first stimulator includes a first controller associated with the first transmitter and first receiver that actuates the first transmitter to transmit the first interrogation signal, the first reply signal in response to the second interrogation signal, and the first acknowledge signal in response to the second reply signal, and that actuates the stimulator to administer the first correction stimulus in response to one of the second reply signal and the second acknowledge signal, and further wherein the second transceiver includes a second transmitter and a second receiver, and the second stimulator includes a second controller associated with the second transmitter and the second receiver that actuates the second transmitter to transmit the second interrogation signal, the second reply signal in response to the first interrogation signal, and the second acknowledge signal in response to the first reply signal, and that actuates the second stimulator to administer the second correction stimulus in response to one of the first reply signal and the first acknowledge signal.

18. The system of claim 16, wherein the first and second interrogation signals include at least one pulse.

19. The system of claim 18, wherein the duration of the first and second interrogation pulses is approximately 0.5 milliseconds.

20. The system of claim 16, wherein the first and second reply signals and the first and second acknowledge signals each include a plurality of pulses.

21. The system of claim 20, wherein the first and second reply signals and the first and second acknowledge signals each include 8 pulses.

22. The system of claim 16, further comprising:

a third transceiver which transmits a third interrogation signal at a third time different than the first or second times, a third reply signal in response to one of the first and second interrogation signals, and a third acknowledge signal in response to one of the first and second reply signals, and receives the first interrogation signal, the second interrogation signal, the first reply signal, the second reply signal, the first acknowledge signal, and the second acknowledge signal when within a third distance; and a third stimulator connected to the third transceiver administers a third corrective stimulus to a third animal in response to one of the first reply signal, the second reply signal, the first acknowledge signal, and the second acknowledge signal.

23. The system of claim 16, wherein the first controller transmits the first reply signal after expiration of a first time delay and the second controller transmits the second reply signal after expiration of a second time delay, the first and second time delays having different values to prevent overlap of the first and second reply signals.

24. The system of claim 16, wherein the first transceiver and the first stimulator are attached to a collar fitted to the first animal, and further wherein the second transceiver and the second stimulator are attached to a collar fitted to the second animal.

25. The system of claim 16, wherein the first stimulator is selectable between an enabled mode in which the first correction stimulus is administered to the first animal in response to one of the second reply signal and the second acknowledge signal, and a disabled mode in which the first stimulator is unresponsive to the second reply signal and the second acknowledge signal, and further wherein the second stimulator is selectable between an enabled mode in which the second correction stimulus is administered to the second animal in response to one of the first reply signal and the first acknowledge signal, and a disabled mode in which the second stimulator is unresponsive to the first reply signal and the first acknowledge signal.

26. The system of claim 16, wherein the first and second stimulator are each configured to administer one of a plurality of corrective stimuli.

27. The system of claim 26, wherein the corrective stimuli administered by both the first and second stimulators include one of a plurality of different levels of electrical energy and a plurality of different levels of tones.

28. The system of claim 16, wherein the first and second distances are adjustable.

29. A separator system, comprising:

first means for transmitting an interrogation signal during a first time interval, and for receiving a reply signal during a second time interval, and for transmitting an acknowledge signal in response to the reply signal during a third time interval;

second means for receiving the interrogation signal, when transmitted within a predetermined distance from the first means, and for transmitting the reply signal during the second time interval in response to the interrogation signal, and for receiving the acknowledge signal; and stimulator means for applying a corrective stimulus to an animal in response to receiving one of the reply signal and the acknowledge signal.

30. The system of claim 29, wherein the predetermined distance is adjustable.

31. A separator system, comprising:

a first transmitter which transmits an interrogation signal during a first time interval and an acknowledge signal in response to a reply signal during a third time interval;

a first receiver receives the reply signal during a second time interval;

a second transmitter transmits the reply signal during the second time interval in response to the interrogation signal;

a second receiver receives the interrogation signal, when transmitted within a predetermined distance from the first transmitter, and the acknowledge signal; and a stimulator for applying a corrective stimulus to an animal in response to one of the reply signal and the acknowledge signal.

32. The system of claim 31, wherein the predetermined distance is adjustable.

* * * * *